United States Patent [19]

Imahori et al.

[11] Patent Number: 4,621,136
[45] Date of Patent: Nov. 4, 1986

[54] PHENYL AZO CYANOTHIENYL AZO ANILINO DYESTUFFS

[75] Inventors: Seiichi Imahori; Kiyoshi Himeno, both of Kanagawa; Shuichi Maeda, Saitama, all of Japan

[73] Assignee: Mitsubishi Chemical Industries, Ltd., Tokyo, Japan

[21] Appl. No.: 334,005

[22] Filed: Dec. 23, 1981

[30] Foreign Application Priority Data

Dec. 26, 1980 [JP] Japan ............................. 55-189018
Dec. 29, 1980 [JP] Japan ............................. 55-186675
Jan. 27, 1981 [JP] Japan ............................. 56-10690
Jan. 27, 1981 [JP] Japan ............................. 56-10691

[51] Int. Cl.$^4$ ..................... C09B 31/043; D06P 1/04; D06P 1/18; D06P 3/54
[52] U.S. Cl. .................................. 534/761; 534/640; 534/753
[58] Field of Search ..................... 260/152; 534/761

[56] References Cited

U.S. PATENT DOCUMENTS 4,264,495 4/1981 Maner et al. ..................... 260/152

FOREIGN PATENT DOCUMENTS 2438496 2/1976 Fed. Rep. of Germany ...... 260/152

Primary Examiner—Floyd D. Higel
Attorney, Agent, or Firm—Sughrue, Mion, Zinn, Macpeak and Seas

[57] ABSTRACT

Disazo dyestuffs for polyester fibers represented by the following general formula:

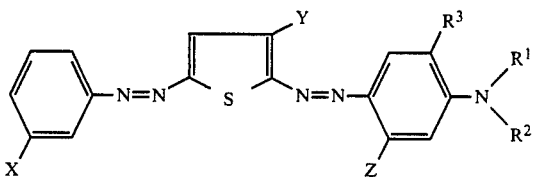

wherein X represents a hydrogen atom, a chlorine atom, a trifluoromethyl group or a nitro group, Y represents a cyano group, a lower alkoxycarbonyl group or a lower alkoxyalkoxycarbonyl group, Z represents a hydrogen atom, a chlorine atom, a bromine atom, a methyl group or an acylamino group, $R^1$ represents a hydrogen atom, a lower alkyl group, a cyanoalkyl group, a hydroxyalkyl group, a lower alkoxyalkyl group, a lower alkoxyalkoxyalkyl group, an aryloxyalkyl group, an acyloxyalkyl group, an alkenyloxyalkyl group, a lower alkoxycarbonylalkyl group, a lower alkoxyalkoxycarbonylalkyl group, a lower alkoxycarbonyloxyalkyl group, an alkenyl group or an aralkyl group, $R^2$ represents a hydrogen atom, a hydroxyalkyl group, a lower alkoxyalkyl group, a lower alkoxyalkoxyalkyl group, an aryloxyalkyl group, an acyloxyalkyl group, an alkenyloxyalkyl group, a lower alkoxycarbonylalkyl group, a lower alkoxyalkoxycarbonylalkyl group, a lower alkoxycarbonyloxyalkyl group, an alkenyl group or an aralkyl group, and $R^3$ represents a hydrogen atom, a methyl group, a chlorine atom or a methoxy group, but $R^2$ may represent a lower alkyl group in case that Y represents a lower alkoxycarbonyl group, Z represents an acylamino group or $R^3$ represents a methyl group. The dyestuffs dye polyester fibers in a brilliant reddish-blue or blue shade and have good fastness properties, excellent temperature stability and pH stability in dyeing.

1 Claim, No Drawings

PHENYL AZO CYANOTHIENYL AZO ANILINO DYESTUFFS

FIELD OF THE INVENTION

The present invention relates to disazo dyestuffs for polyester fibers.

The dyestuffs of the present invention dye polyester fibers in brilliant reddish blue or blue shade and have good fastness properties, especially good fastness to light, good fastness to sublimation and good fastness to water and excellent temperature stability and pH stability in dyeing.

Further, the dyestuffs of the present invention less cause pollution of white texture in printing and have excellent white dischargeability in alkali resist- or discharge printing.

BACKGROUND OF THE INVENTION

The following dyestuff has been described in Japanese Patent Application (OPI) No. 47680/74 (U.S. Pat. No. 4,264,495) (the term "OPI" as used herein refers to a "published unexamined Japanese patent application"):

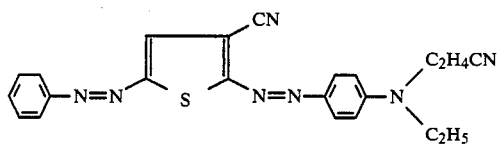

The above-described dyestuff causes pollution of white texture in printing and has insufficient white dischargeability in alkali resist- or discharge printing.

Dyestuffs represented by the following general formula have been described in Japanese Patent Application (OPI) No. 41734/76 (German Patent Application (OLS) No. 2,438,496).

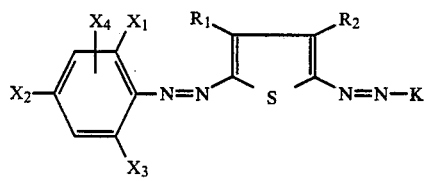

wherein K represents a group of coupling components, $R_1$ represents $C_1$–$C_4$ alkyl, aryl, $C_1$–$C_4$ alkoxycarbonyl or hydrogen, $R_2$ represents aryl, $C_1$–$C_4$ alkoxycarbonyl, $CONW_1W_2$ or cyano, $X_1$ and $X_2$ represent each hydrogen, chlorine, bromine, cyano, $CF_3$, nitro, $C_1$–$C_4$ alkyl, $C_1$–$C_4$ alkoxy, phenyl, $C_1$–$C_4$ alkycarbonyl, $C_1$–$C_4$ alkoxycarbonyl, $C_1$–$C_4$ alkylsulfonyl, arylsulfonyl, benzylsulfonyl, COOH, $SO_2W_1W_2$ or $CONW_1W_2$ but do not represent hydrogen at the same time, $X_3$ represents hydrogen, $C_1$–$C_4$ alkyl, $C_1$–$C_4$ alkoxy, chlorine, bromine or cyano, and $X_4$ represents hydrogen, methyl, chlorine or bromine, wherein $W_1$ and $W_2$ represent each H, $C_1$–$C_4$ alkyl or hydroxyethyl or form a residue of a 5-member or 6-member saturated heterocyclic ring by linking together. However, dyestuffs described in concrete in the above-described Japanese Patent Application (OPI) No. 41734/76 have a problem for practical use because of having inferior temperature stability in dyeing.

SUMMARY OF THE INVENTION

The disazo dyestuffs of the present invention are represented by the following general formula (I):

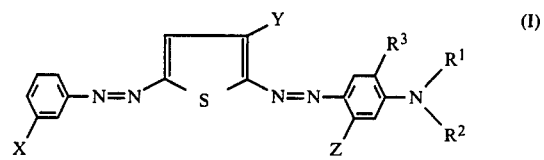

wherein X represents a hydrogen atom, a chlorine atom, a trifluoromethyl group or a nitro group, Y represents a cyano group, a lower alkoxycarbonyl group or a lower alkoxyalkoxycarbonyl group, Z represents a hydrogen atom, a chlorine atom, a bromine atom, a methyl group or an acylamino group, $R^1$ represents a hydrogen atom, a lower alkyl group, a cyanoalkyl group, a hydroxyalkyl group, a lower alkoxyalkyl group, a lower alkoxyalkoxyalkyl group, an aryloxyalkyl group, an acyloxyalkyl group, an alkenyloxyalkyl group, a lower alkoxycarbonylalkyl group, a lower alkoxyalkoxycarbonylalkyl group, a lower alkoxycarbonyloxyalkyl group, an alkenyl group or an aralkyl group, $R^2$ represents a hydrogen atom, a hydroxyalkyl group, a lower alkoxyalkyl group, a lower alkoxyalkoxyalkyl group, an aryloxyalkyl group, an acyloxyalkyl group, an alkenyloxyalkyl group, a lower alkoxycarbonylalkyl group, a lower alkoxyalkoxycarbonylalkyl group, a lower alkoxycarbonyloxyalkyl group, an alkenyl group or an aralkyl group, and $R^3$ represents a hydrogen atom, a methyl group, a chlorine atom or a methoxy group, but $R^2$ may represent a lower alkyl group in case that Y represents a lower alkoxycarbonyl group, Z represents an acylamino group or $R^3$ represents a methyl group.

DETAILED DESCRIPTION OF THE INVENTION

In the above-described general formula (I), examples of the lower alkoxycarbonyl group represented by Y include a methoxycarbonyl group, an ethoxycarbonyl group, and a butoxycarbonyl group, etc.; and examples of the lower alkoxyalkoxycarbonyl group include a methoxyethoxycarbonyl group, an ethoxyethoxycarbonyl group, a propoxyethoxycarbonyl group and a butoxyethoxycarbonyl group, etc.

Examples of the acylamino group represented by Z include an acetylamino group, a chloroacetylamino group, a propionylamino group, a methylsulfonylamino group, a chloropropionylamino group, a methoxycarbonylamino group and an ethoxycarbonylamino group, etc.

Examples of the lower alkyl group represented by $R^1$ include a methyl group, an ethyl group and straight chain or branched chain propyl and butyl groups, etc.; and examples of the cyanoalkyl group include a cyanomethyl group and a cyanoethyl group, etc.

Examples of hydroxyalkyl groups represented by $R^1$ and $R^2$ include a hydroxyethyl group, a hydroxypropyl group, a hydroxybutyl group and a hydroxyhexyl group, etc.; examples of lower alkoxyalkyl groups include a methoxyethyl group, an ethoxyethyl group and a butoxyethyl group, etc.; examples of lower alkoxyalkoxyalkyl groups include a methoxyethoxyethyl group and an ethoxyethoxyethyl group, etc.; an example of aryloxyalkyl groups include a phenoxyethyl group, etc.;

examples of acyloxyalkyl groups include an acetyloxyethyl group, a propionyloxyethyl group and a benzoyloxyethyl group, etc.; examples of alkenyloxyalkyl groups include an allyloxyethyl group and a crotyloxyethyl group, etc.; examples of the lower alkoxycarbonylalkyl groups include a methoxycarbonylmethyl group, a methoxycarbonylethyl group, a methoxycarbonylpropyl group, an ethoxycarbonylmethyl group, an ethoxycarbonylethyl group and a butoxycarbonylethyl group, etc.; examples of the lower alkoxyalkoxycarbonylalkyl groups include a methoxyethoxycarbonylmethyl group, a methoxyethoxycarbonylethyl group, an ethoxyethoxycarbonylethyl group, a methoxyethoxycarbonylpropyl group and a butoxyethoxycarbonylethyl group, etc.; examples of the lower alkoxycarbonyloxyalkyl groups include a methoxycarbonyloxyethyl group and an ethoxycarbonyloxyethyl group, etc.; examples of the alkenyl groups include an allyl group, a 2-methylallyl group and a crotyl group, etc.; and examples of the aralkyl groups include a benzyl group and a phenethyl group, etc.

The disazo dyestuffs represented by the general formula (I) can be prepared by a process which comprises diazotizing amines represented by the following formula (II):

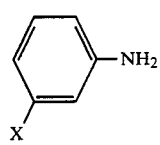

(II)

wherein X represents the same meaning as described above, coupling the diazotized amines with aminothiophenes represented by the following formula (III):

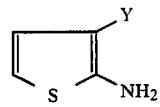

(III)

wherein Y represents the same meaning as described above, diazotizing the resulted monoazo compounds represented by the following formula (IV):

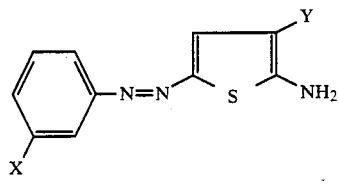

(IV)

wherein X and Y represent each the same meaning as described above, and coupling the diazotized monoazo compounds with anilines represented by the following formula (V):

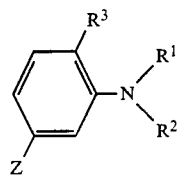

(V)

wherein Z, $R^1$, $R^2$ and $R^3$ represent each the same meaning as described above.

Examples of fibers capable of dyeing with using the disazo dyestuffs of the present invention include polyethylene terephthalate fibers, polyester fibers composed of polycondensates of terephthalic acid and 1,4-bis(hydroxymethyl)cyclohexane, and blended spinning goods and woven cloth of blended spun yarns prepared with using natural fibers such as cotton, silk, or wool, etc., and the above-described polyester fibers.

In order to dye the polyester fibers with using the dyestuffs represented by the above-described general formula (I) of the present invention, a dyeing bath or a printing paste is prepared by dispersing the dyestuff in an aqueous medium with using a dispersing agent such as a condensate of naphthalenesulfonic acid and formaldehyde, higher alcohol sulfate or higher alkylbenzenesulfonic acid salt, etc., by means of a conventional method, because the dyestuff is insoluble or bad-soluble in water, and dip-dyeing or printing is carried out. For example, in case of dip-dyeing, dyeings having excellent fastness can be obtained on the polyester fibers or blended spinning goods thereof, when a conventional dyeing process such as a high-temperature dyeing process, a carrier dyeing process or a thermosol dyeing process, etc., is used. In such a case, if necessary, further excellent results are obtained by adding an acid substance such as formic acid, acetic acid, phosphoric acid or ammonium sulfate, etc., to the dyeing bath.

Further, the dyestuffs represented by the above-described general formula (I) of the present invention may be used together with the same kind of dyestuff or with another kind of dyestuff. In such cases, good results, for example, an improvement of dyeing properties, etc., are obtained sometimes by blending two or more dyestuffs represented by the above-described general formula (I).

As resist- or discharge printing process for polyester fibers used in the present invention, there are various processes. The first process comprises carrying out pad-dyeing woven cloth of polyester fibers with a dispersion containing monoazo dyestuffs represented by the general formula (I) and various auxiliaries, drying at a temperature ranging from 80° C. to 150° C., printing the resulted cloth with a resist- and discharge printing paste containing bases such as K$_2$CO$_3$ and various dyeing auxiliaries, subjecting thereafter a heat treatment at a temperature ranging from 100° C. to 230° C. to set the monoazo dyestuffs represented by the general formula (I) and decompose the monoazo dyestuffs on the area where the resist- and discharge printing paste was not applied, and carrying out a post-treatment by a conventional manner. The second process comprises printing woven cloth of polyester fibers with a resist- and discharge printing paste, drying or not drying at a temperature ranging from 80° C. to 150° C., subsequently printing the woven cloth with a printing paste containing the monoazo dyestuffs represented by the general formula (I) and various dyeing auxiliaries, subjecting thereafter a heat treatment at a temperature ranging from 100° C. to 230° C. to set the monoazo dyestuffs represented by the general formula (I) and decompose the monoazo dyestuffs on the area where the resist- and discharge printing paste was not applied, and carrying out a post-treatment by a conventional manner. Further, the third process comprises printing woven cloth of polyester fibers with the monoazo dyestuffs represented by the general formula (I) and various auxiliaries, drying at a temperature ranging from 80° C. to 150° C., printing the woven cloth with a resist- and discharge printing paste, subjecting a heat treatment at a temperature ranging from 100° C. to 230° C. to set the monoazo dyestuffs represented by the general formula (I) and decompose the monoazo dyestuffs on the area where the resist- and discharge printing paste was applied, and carrying out a post-treatment by a conventional manner.

When the above-described various resist- and discharge printing processes are applied to the woven cloth of polyester fibers, it is possible to form multicolor designs by addition of alkali resisting dyestuffs described in the following to the resist- and discharge printing paste.

In the following, the present invention is illustrated in concrete with reference to examples.

EXAMPLE 1

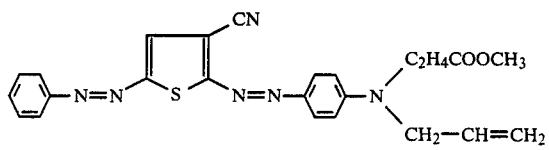

100 g of polyester fibers was dipped in a dyeing bath prepared by dispersing 0.5 g of a dyestuff represented by the above-described formula in 3 l of water containing 1 g of naphthalenesulfonic acid-formaldehyde condensate and 2 g of higher alcohol sulfate. After the fibers were dyed at 130° C. for 60 minutes, they were subjected to soaping, washing and drying, by which dyed fibers having a brilliant reddish blue shade were obtained. The resulted dyed fibers had good fastness to light, good fastness to sublimation and good fastness to water, and the above-described dyestuff had good temperature stability and good pH stability in dyeing.

The dyestuff used in this example was prepared as follows.

9.3 g of aniline was dissolved in 100 ml of 7% hydrochloric acid. After the resulted solution was cooled to 2° C., 50 ml of 2N sodium nitrite were added thereto. The temperature in this case was controlled so as not to exceed 5° C. The resulted solution of diazonium salt of aniline was added to a solution containing 12.4 g of 2-amino-3-cyanothiophene in 200 ml of methanol at 2° C., and the mixture was stirred for 2 hours at this temperature. After the separated monoazo compound was separated by filtration, it was washed with water and dried. 11.4 g of this monoazo compound (2-amino-3-cyano-5-phenylazothiophene) was added to a mixture composed of 114 ml of acetic acid and 114 ml of phosphoric acid. Then, nitrosylsulfuric acid (which was prepared by dissolving 3.5 g of sodium nitrite in 20 g of 97% sulfuric acid) was slowly added to the resulted mixture, and the mixture was stirred at the same temperature as described above for 30 minutes to prepare a solution of diazotized monoazo compound.

9.3 g of N-allyl-N-(β-cyanoethyl)aniline was dissolved in 200 ml of methanol, and the resulted solution was added to a mixture composed of 200 g of ice and 100 ml of water. To the resulted mixture, the previously prepared solution of diazotized monoazo compound was added, and the resulted mixture was stirred at 0° to 5° C. for 2 hours. After the separated disazo dyestuff was separated by filtration, it was washed with water and dried. The resulted dyestuff had λmax (acetone) of 612 nm.

EXAMPLE 2

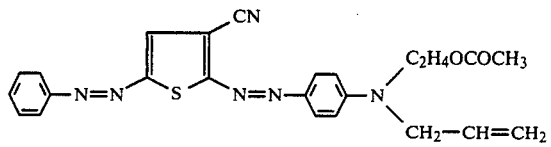

A woven fabric of polyester fibers was printed with using a printing paste which was prepared by finely dispersing 30 g of a dyestuff represented by the above-described structural formula and adding 24 g of Cellucol PBL-600 (produced by Adachi Koryo Co.), 45.5 g of Kiprogum P-20N (produced by Nichiden Chemical Co.), 1.5 g of tartaric acid, 10.2 g of MS Powder (produced by Meisei Kagaku Co.), 30 g of Meiprinter Y-75 (produced by Meisei Kagaku Co.) and 858.8 ml of water. It was subjected to setting at 175° C. for 6 minutes by superheated steam, a reductive post-treatment and a soaping treatment. After carried out rinsing and drying, a dyed woven fabric having a brilliant blue shade of especially good fastness to light, sublimation and water was obtained. The temperature stability and the pH stability of the above-described dyestuff in dyeing were excellent.

The dyestuff used in this example was prepared according to Example 1. This dyestuff had λmax (acetone) of 610 nm.

EXAMPLE 3

A woven fabric of polyester fibers was printed with using a resist- and discharge printing paste composed of 60 g of sodium carbonate, 60 g of Color Fine AD (produced by Dai-ichi Kogyo Seiyaku Co.), 600 g of a 25% aqueous solution of Texprint LB (produced by Grünau Co.) and 280 ml of water, and dried at 80° to 100° C. After dried, it was overprinted with using a printing paste which was prepared by finely dispersing 30 g of a dyestuff represented by the following structural formula

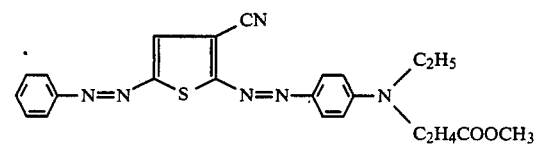

and adding 24 g of Cellucol PBL-600 (produced by Adachi Koryo Co.), 45.5 g of Kiprogum P-20N (produced by Nichiden Chemical Co.), 1.5 g of tartaric acid, 10.2 g of MS Powder (produced by Meisei Kagaku Co.), 30 g of Meiprinter Y-75 (produced by Meisei Kagaku Co.) and 858.8 ml of water. It was subjected to setting at 175° C. for 6 minutes by superheated steam, a reductive post-treatment and a soaping treatment. After carrying out rinsing and drying, a dyed woven fabric having a brilliant blue shade of especially good fastness to light, sublimation and water was obtained. A very excellent white resist printing having a sharp outline was obtained on the area where the sodium carbonate containing resist- and discharge printing paste was applied by printing. The temperature stability and the pH stability of the above-described dye in dyeing were excellent.

The dyestuff used in this example was prepared according to Example 1. This dyestuff had λmax (acetone) of 619 nm.

EXAMPLE 4

Dyestuffs shown in the following Table 1 and Table 2 were prepared by the same process as in Example 1. Polyester fibers were dyed with using these dyestuffs. λmax (acetone) of each dyestuff and the shade of dyeing fabrics are shown in these tables.

TABLE 1

Structure: 3-X-phenyl-N=N-[thiophene(Y,Z)]-N=N-phenyl(Z')-N(R¹)(R²)

| No. | X | Y | Z | R¹ | R² | Dyeing Shade (on polyester fibers) | λ max (acetone) nm |
|---|---|---|---|---|---|---|---|
| 1 | H | COOCH₃ | H | C₂H₄CN | CH₂—CH=CH₂ | Brilliant reddish blue | 582 |
| 2 | " | CN | NHCOCH₃ | CH₂—CH=CH₂ | " | Brilliant blue | 631 |
| 3 | " | " | CH₃ | C₂H₄CN | C₂H₄OCH₂CH=CH₂ | " | 604 |
| 4 | " | " | H | " | CH₂—CH=CH₂ | " | 597 |
| 5 | " | " | " | CH₂—CH=CH₂ | CH₂COOCH₃ | Reddish blue | 595 |
| 6 | " | " | " | " | C₂H₄OCOOC₂H₅ | Brilliant blue | 608 |
| 7 | " | " | " | " | C₂H₄OCH₃ | " | 618 |
| 8 | " | COOCH₃ | " | " | C₂H₄OCOCH₃ | Reddish blue | 593 |
| 9 | " | COOC₂H₅ | " | " | " | " | 592 |
| 10 | " | CN | CH₃ | " | " | Brilliant blue | 620 |
| 11 | " | " | " | C₂H₄CN | CH₂—CH=CH₂ | " | 607 |
| 12 | " | " | " | CH₂CN | " | " | 597 |
| 13 | " | COOCH₃ | " | C₂H₄CN | " | Reddish blue | 592 |
| 14 | " | " | " | " | C₂H₄OCH₂—CH=CH₂ | " | 590 |
| 15 | " | CN | NHCOCH₃ | " | CH₂—CH=CH₂ | Brilliant blue | 625 |
| 16 | " | " | " | C₂H₄OCH₂—CH=CH₂ | C₂H₄OCH₂—CH=CH₂ | " | 630 |
| 17 | " | " | H | C₂H₄CN | CH₂—C(CH₃)=CH₂ | Reddish blue | 598 |
| 18 | " | " | " | CH₂—CH=CH₂ | C₂H₄OCH₃ | Brilliant blue | 620 |
| 19 | " | COOCH₃ | " | C₂H₄CN | C₂H₅ | Brilliant reddish blue | 585 |
| 20 | " | " | " | " | C₂H₄OCOCH₃ | Brilliant blue | 600 |
| 21 | " | COOC₂H₅ | " | C₂H₄CN | C₂H₅ | Brilliant reddish blue | 585 |
| 22 | " | COOCH₃ | CH₃ | C₂H₅ | C₂H₄OH | Brilliant blue | 625 |
| 23 | " | " | NHCOCH₃ | " | C₂H₅ | " | 620 |
| 24 | " | " | H | " | C₂H₄OCH₃ | Brilliant reddish blue | 595 |
| 25 | " | " | " | " | C₂H₄COOCH₃ | Reddish blue | 600 |
| 26 | " | " | " | " | CH₂COOCH₃ | " | 582 |
| 27 | " | " | " | " | C₂H₄OCOOC₂H₅ | " | 596 |
| 28 | " | " | " | " | C₂H₄OC₄H₉(n) | Blue | 606 |
| 29 | " | COOC₂H₅ | " | " | C₂H₄OCOCH₃ | Reddish blue | 593 |
| 30 | " | COOCH₃ | " | " | C₂H₅ | Blue | 615 |
| 31 | " | " | " | CH₃ | CH₃ | " | 608 |
| 32 | " | " | " | C₂H₅ | CH₂—C₆H₅ | " | 603 |
| 33 | " | " | " | " | H | Reddish blue | 580 |
| 34 | " | " | " | " | C₂H₄O—C₆H₅ | Blue | 605 |
| 35 | " | " | " | " | C₂H₄OCH₃ | C₂H₄OCH₃ | " | 600 |
| 36 | " | " | " | " | C₂H₄OCOCH₃ | C₂H₄OCOCH₃ | Reddish blue | 583 |
| 37 | " | " | " | " | C₂H₄COOCH₃ | C₂H₄COOCH₃ | " | 585 |
| 38 | " | " | CH₃ | C₂H₄CN | C₂H₅ | " | 596 |
| 39 | " | " | " | C₂H₅ | C₂H₄OCOCH₃ | Blue | 604 |
| 40 | " | COOC₄H₉(n) | " | C₂H₄CN | C₂H₅ | Reddish blue | 596 |
| 41 | " | COOCH₃ | Cl | C₂H₅ | H | " | 590 |
| 42 | " | " | " | C₂H₄COOCH₃ | C₂H₄COOCH₃ | " | 595 |
| 43 | " | " | " | C₂H₄OCOOCH₃ | C₂H₄OCOOCH₃ | " | 592 |
| 44 | " | " | NHCOCH₃ | C₂H₅ | C₂H₅ | Blue | 630 |
| 45 | " | " | NHCOC₂H₅ | C₂H₄CN | " | " | 610 |
| 46 | " | " | NHCOC₂H₄Cl | C₂H₅ | " | " | 628 |
| 47 | " | " | NHSO₂CH₃ | " | " | " | 624 |
| 48 | " | " | NHCOOCH₃ | " | " | " | 628 |

TABLE 1-continued

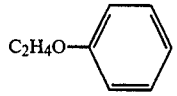

| No. | X | Y | Z | R¹ | R² | Dyeing Shade (on polyester fibers) | λ max (acetone) nm |
|---|---|---|---|---|---|---|---|
| 49 | " | " | NHCOCH₃ | C₂H₄OCH₃ | C₂H₄OCH₃ | " | 640 |
| 50 | " | " | " | C₂H₄OH | C₂H₄OH | " | 646 |
| 51 | " | " | " | C₂H₄COOCH₃ | C₂H₄COOCH₃ | " | 618 |
| 52 | " | CN | H | C₂H₅ | C₂H₄OCOCH₃ | Brilliant blue | 618 |
| 53 | " | " | " | " | CH₂COOCH₃ | Brilliant reddish blue | 597 |
| 54 | " | " | CH₃ | C₂H₄COOCH₃ | C₂H₄COOCH₃ | Brilliant blue | 615 |
| 55 | " | " | " | C₂H₅ | C₂H₄OH | " | 648 |
| 56 | " | " | NHCOCH₃ | " | C₂H₅ | " | 645 |
| 57 | " | " | H | C₂H₄OCOCH₃ | C₂H₄OCOCH₃ | " | 604 |
| 58 | " | " | " | C₂H₅ | C₂H₄COOC₂H₄OCH₃ | " | 620 |
| 59 | " | " | " | " | C₂H₄OCOOCH₃ | " | 617 |
| 60 | " | " | " | C₄H₉(n) | H | " | 626 |
| 61 | " | " | " | C₂H₄COOCH₃ | C₂H₄COOCH₃ | Reddish blue | 602 |
| 62 | " | " | " | C₂H₅ | C₂H₄OH | Brilliant blue | 638 |
| 63 | " | " | " | C₂H₄OCOCH₃ | C₂H₄COOCH₃ | " | 604 |
| 64 | " | " | " | C₂H₅ | 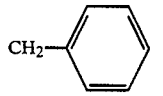 | " | 628 |
| 65 | " | " | " | " | 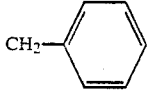 | " | 620 |
| 66 | " | " | " | " | C₂H₄OCH₃ | " | 631 |
| 67 | " | " | " | " | C₂H₄OC₂H₄OCH₃ | " | 630 |
| 68 | " | " | CH₃ | " | C₂H₄OCOCH₃ | " | 631 |
| 69 | " | " | " | C₂H₄OCOCH₃ | " | " | 613 |
| 70 | " | " | " | C₂H₅ | C₂H₄COOCH₃ | " | 628 |
| 71 | " | " | " | C₂H₄OCH₃ | C₂H₄OCH₃ | " | 638 |
| 72 | " | " | " | C₂H₄OCOOCH₃ | C₂H₄OCOOCH₃ | " | 617 |
| 73 | " | " | Cl | H | C₂H₄COOCH₃ | " | 608 |
| 74 | " | " | " | C₂H₅ | H | " | 625 |
| 75 | " | " | " | C₂H₄OH | C₂H₄OH | " | 633 |
| 76 | " | " | " | C₂H₄OCOCH₃ | C₂H₄OCOCH₃ | " | 610 |
| 77 | " | " | NHCOCH₃ | " | " | " | 625 |
| 78 | " | " | " | C₂H₄OCH₃ | C₂H₄OCH₃ | " | 635 |
| 79 | " | " | " | H | C₂H₄COOC₂H₄OCH₃ | " | 615 |
| 80 | " | " | NHSO₂CH₃ | C₂H₅ | C₂H₅ | " | 638 |
| 81 | " | " | NHCOOCH₃ | " | " | " | 640 |
| 82 | " | " | NHCOC₂H₄Cl | " | " | " | 640 |
| 83 | " | " | Br | " | C₂H₄OCOCH₃ | Blue | 602 |
| 84 | " | " | " | C₂H₄OCOCH₃ | " | Violet | 587 |
| 85 | " | " | " | C₂H₄OCH₃ | CH₂COOCH₃ | " | 588 |
| 86 | " | COOC₂H₄OCH₃ | H | C₂H₄OCOCH₃ | C₂H₄OCOCH₃ | " | 593 |
| 87 | " | COOC₂H₄OC₂H₅ | " | C₂H₄OCH₃ | C₂H₄OCH₃ | " | 596 |
| 88 | " | " | " | C₂H₄CN | C₂H₄OCOOCH₃ | " | 581 |
| 89 | Cl | COOCH₃ | " | " | C₂H₅ | Reddish blue | 602 |
| 90 | " | " | " | C₂H₅ | " | Brilliant blue | 638 |
| 91 | " | " | " | " | 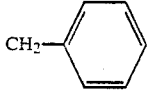 | " | 630 |
| 92 | " | COOC₂H₅ | " | CH₃ | C₂H₄COOCH₃ | Reddish blue | 598 |
| 93 | " | CN | Br | CH₂—CH=CH₂ | " | Blue | 597 |
| 94 | " | " | H | C₂H₄CN | CH₂—CH=CH₂ | Brilliant blue | 602 |
| 95 | " | " | " | " | CH₂COOCH₃ | " | 600 |
| 96 | " | " | CH₃ | C₂H₄OCOCH₃ | " | " | 612 |
| 97 | " | " | H | C₂H₅ | C₂H₄OCOCH₃ | " | 626 |
| 98 | " | " | " | C₂H₄OCOCH₃ | C₂H₄OCOCH₃ | " | 613 |

TABLE 1-continued

[Structure: phenyl(X at meta)-N=N-thiophene(Y)-N=N-phenyl(Z)-NR¹R²]

| No. | X | Y | Z | R¹ | R² | Dyeing Shade (on polyester fibers) | λ max (acetone) nm |
|---|---|---|---|---|---|---|---|
| 99 | " | " | CH$_3$ | C$_2$H$_5$ | C$_2$H$_4$O—C$_6$H$_5$ | " | 650 |
| 100 | " | " | NHCOCH$_3$ | C$_2$H$_5$ | C$_2$H$_5$ | " | 645 |
| 101 | CF$_3$ | COOCH$_3$ | H | C$_2$H$_4$CN | CH$_2$—CH=CH$_2$ | Reddish blue | 599 |
| 102 | " | " | CH$_3$ | " | " | Brilliant blue | 610 |
| 103 | " | CN | H | " | " | " | 604 |
| 104 | " | " | " | C$_2$H$_4$OCOCH$_3$ | " | " | 615 |
| 105 | " | " | " | C$_2$H$_4$CN | C$_2$H$_4$OCH$_2$—CH=CH$_2$ | " | 613 |
| 106 | " | " | NHCOCH$_3$ | " | CH$_2$—CH=CH$_2$ | " | 642 |
| 107 | " | " | CH$_3$ | C$_2$H$_5$ | C$_2$H$_4$OH | " | 656 |
| 108 | " | " | NHCOCH$_3$ | " | C$_2$H$_5$ | " | 650 |
| 109 | " | COOCH$_3$ | H | " | C$_2$H$_4$OCOCH$_3$ | Brilliant reddish blue | 605 |
| 110 | " | CN | " | " | C$_2$H$_4$COOC$_2$H$_4$OCH$_3$ | Brilliant blue | 632 |
| 111 | " | " | " | " | C$_2$H$_4$OCH$_3$ | " | 636 |
| 112 | " | COOCH$_3$ | NHCOCH$_3$ | " | C$_2$H$_5$ | " | 636 |
| 113 | " | CN | " | " | " | " | 650 |
| 114 | " | " | CH$_3$ | " | C$_2$H$_4$OCOCH$_3$ | " | 642 |
| 115 | " | " | " | " | C$_2$H$_4$COOCH$_3$ | " | 643 |
| 116 | " | " | " | C$_2$H$_4$COOCH$_3$ | C$_2$H$_4$COOCH$_3$ | " | 628 |
| 117 | " | " | NHCOCH$_3$ | C$_2$H$_4$OCH$_3$ | C$_2$H$_4$OCH$_3$ | " | 644 |
| 118 | " | " | " | C$_2$H$_4$OCOCH$_3$ | C$_2$H$_4$OCOCH$_3$ | " | 636 |
| 119 | " | COOCH$_3$ | CH$_3$ | C$_2$H$_4$CN | C$_2$H$_5$ | " | 616 |
| 120 | " | " | " | C$_2$H$_5$ | C$_2$H$_4$OCOCH$_3$ | " | 629 |
| 121 | " | COOC$_2$H$_5$ | Cl | " | " | " | 620 |
| 122 | " | COOC$_2$H$_4$OC$_2$H$_5$ | Br | C$_2$H$_4$OCOCH$_3$ | " | Blue | 593 |
| 123 | " | COOC$_2$H$_4$OC$_4$H$_9$(n) | CH$_3$ | C$_2$H$_5$ | C$_2$H$_4$OCH$_3$ | " | 605 |
| 124 | NO$_2$ | CN | H | " | C$_2$H$_4$OCOCH$_3$ | Brilliant blue | 638 |
| 125 | " | COOCH$_3$ | " | C$_2$H$_4$CN | C$_2$H$_5$ | Brilliant reddish blue | 608 |
| 126 | " | CN | " | C$_2$H$_5$ | C$_2$H$_4$COOCH$_3$ | Brilliant blue | 639 |
| 127 | " | " | " | " | C$_2$H$_4$OCOOCH$_3$ | " | 636 |
| 128 | " | " | " | C$_4$H$_9$(n) | H | " | 629 |
| 129 | " | " | " | C$_2$H$_5$ | CH$_2$COOCH$_3$ | " | 624 |
| 130 | " | " | " | " | C$_2$H$_4$OH | " | 645 |
| 131 | " | " | " | C$_2$H$_4$OCOCH$_3$ | C$_2$H$_4$OCOCH$_3$ | " | 626 |
| 132 | " | " | " | C$_2$H$_5$ | C$_2$H$_4$O—C$_6$H$_5$ | " | 641 |
| 133 | " | " | " | " | CH$_2$—C$_6$H$_5$ | " | 638 |
| 134 | " | " | " | " | C$_2$H$_4$OCH$_3$ | " | 642 |
| 135 | " | " | " | " | C$_2$H$_4$OC$_2$H$_4$OCH$_3$ | " | 642 |
| 136 | " | COOCH$_3$ | " | " | C$_2$H$_4$OCOCH$_3$ | " | 618 |
| 137 | " | COOC$_2$H$_5$ | " | " | " | " | 618 |
| 138 | " | CN | CH$_3$ | " | C$_2$H$_4$OCOCH$_3$ | " | 649 |
| 139 | " | " | " | C$_2$H$_4$CN | " | " | 627 |
| 140 | " | " | " | C$_2$H$_4$OCOOCH$_3$ | C$_2$H$_4$OCOOCH$_3$ | " | 630 |
| 141 | " | " | " | C$_2$H$_4$COOCH$_3$ | C$_2$H$_4$COOCH$_3$ | " | 631 |
| 142 | " | " | NHCOCH$_3$ | C$_2$H$_5$ | C$_2$H$_5$ | " | 656 |
| 143 | " | " | " | C$_2$H$_4$OCH$_3$ | C$_2$H$_4$OCH$_3$ | " | 652 |
| 144 | " | " | Cl | C$_2$H$_4$OCOCH$_3$ | C$_2$H$_4$OCOCH$_3$ | " | 620 |
| 145 | " | COOCH$_3$ | CH$_3$ | C$_2$H$_5$ | " | " | 613 |
| 146 | " | " | " | C$_2$H$_4$CN | C$_2$H$_5$ | " | 608 |
| 147 | " | " | Br | C$_2$H$_4$OCOCH$_3$ | C$_2$H$_4$OCOCH$_3$ | Blue | 615 |

TABLE 2

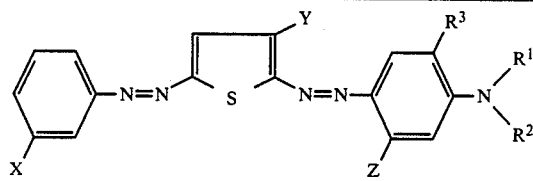

| No. | X | Y | Z | $R^1$ | $R^2$ | $R^3$ | Dyeing Shade (on polyester fibers) | λ max (acetone) nm |
|---|---|---|---|---|---|---|---|---|
| 148 | H | COOCH$_3$ | H | C$_2$H$_4$CN | CH$_2$—CH=CH$_2$ | CH$_3$ | Brilliant blue | 603 |
| 149 | " | CN | " | C$_2$H$_5$ | C$_2$H$_4$COOCH$_3$ | " | " | 626 |
| 150 | " | " | " | " | CH$_2$COOCH$_3$ | " | " | 613 |
| 151 | " | " | " | H | C$_2$H$_4$COOCH$_3$ | " | " | 605 |
| 152 | " | " | " | " | C$_2$H$_4$COOC$_2$H$_4$OCH$_3$ | " | " | 605 |
| 153 | " | " | " | C$_2$H$_4$OCOCH$_3$ | C$_2$H$_4$OCOCH$_3$ | " | " | 614 |
| 154 | " | " | " | C$_2$H$_5$ | C$_2$H$_4$OH | " | " | 637 |
| 155 | " | " | " | H | —CH$_2$—CH(CH$_3$)—OCOCH$_3$ | " | " | 609 |
| 156 | " | " | " | " | C$_2$H$_4$OCH$_3$ | " | " | 621 |
| 157 | " | " | CH$_3$ | C$_2$H$_5$ | C$_2$H$_4$OCOCH$_3$ | " | " | 639 |
| 158 | " | " | " | " | " | Cl | " | 602 |
| 159 | " | " | H | " | C$_2$H$_4$COOCH$_3$ | " | " | 601 |
| 160 | " | " | " | C$_2$H$_4$OH | H | " | " | 621 |
| 161 | " | " | " | C$_2$H$_4$OCOCH$_3$ | C$_2$H$_4$OCOCH$_3$ | " | " | 592 |
| 162 | " | " | NHCOCH$_3$ | C$_2$H$_5$ | C$_2$H$_5$ | CH$_3$ | " | 648 |
| 163 | " | " | H | C$_2$H$_4$OCOCH$_3$ | C$_2$H$_4$OCOCH$_3$ | OCH$_3$ | " | 624 |
| 164 | " | " | " | C$_2$H$_4$COOCH$_3$ | H | " | " | 613 |
| 165 | " | " | " | C$_2$H$_4$CN | C$_2$H$_4$OCOOC$_2$H$_5$ | " | " | 607 |
| 166 | " | COOC$_2$H$_5$ | " | C$_2$H$_4$COOCH$_3$ | H | CH$_3$ | " | 601 |
| 167 | " | " | " | C$_2$H$_4$OCOCH$_3$ | C$_2$H$_4$OCOCH$_3$ | " | " | 612 |
| 168 | Cl | CN | " | " | " | " | " | 624 |
| 169 | " | " | " | C$_2$H$_4$COOCH$_3$ | H | " | " | 613 |
| 170 | " | " | NHCOCH$_3$ | C$_2$H$_5$ | C$_2$H$_5$ | " | " | 659 |
| 171 | " | " | NHSO$_2$CH$_3$ | " | " | Cl | " | 646 |
| 172 | NO$_2$ | " | H | " | C$_2$H$_4$OCOCH$_3$ | CH$_3$ | " | 643 |
| 173 | " | " | CH$_3$ | " | " | OCH$_3$ | " | 657 |
| 174 | CF$_3$ | " | Cl | C$_2$H$_4$OCOCH$_3$ | " | CH$_3$ | " | 623 |
| 175 | " | " | H | C$_2$H$_4$OC$_2$H$_4$OCH$_3$ | H | " | " | 607 |
| 176 | H | " | " | C$_2$H$_4$CN | C$_2$H$_5$ | " | " | 605 |

REFERENCE EXAMPLE 1

The dyestuffs of the present invention and the known dyestuff (dyestuff described in Japanese Patent Application (OPI) No. 47680/74) were examined in order to measure pollution of the white texture in printing and white dischargeability in alkali resist- and discharge printing.

(a) Pollution of white texture:

A woven fabric of polyester fibers was printed with using dyestuffs shown in the following Table 3 according to the process described in Example 2, and the degree of pollution on non-dyeing parts (white texture) caused by the non-setting dyestuff was determined by a gray scale (indication of 5 grades).

(b) White dischargeability in alkali resist- and discharge printing:

A woven fabric of polyester fibers was printed with using dyestuffs shown in the following Table 3 according to the process described in Example 3, and the white part was determined by a gray scale (indication of 5 grades).

Grade 5 is the best value in both cases of pollution of white texture and white dischargeability. The dyestuff which shows values nearer grade 5 has a high commercial value, because the pollution of white texture is less caused and the white dischargeability is better.

TABLE 3

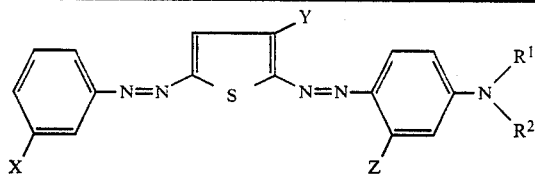

| | X | Y | Z | $R^1$ | $R^2$ | Pollution of white texture (grade) | White dischargeability in alkali resist- and discharge printing |
|---|---|---|---|---|---|---|---|
| Dyestuff for comparison | H | CN | H | C$_2$H$_5$ | C$_2$H$_4$CN | 1 | 1 |

TABLE 3-continued

[Structure: phenyl(X)-N=N-thiophene(S,Y)-N=N-phenyl(Z)-N(R¹)(R²)]

| | X | Y | Z | R¹ | R² | Pollution of white texture (grade) | White dischargeability in alkali resist- and discharge printing |
|---|---|---|---|---|---|---|---|
| Dyestuff of this invention | | | | | | | |
| 1 | H | CN | H | $C_2H_5$ | $C_2H_4COOCH_3$ | 4 | 4 |
| 2 | " | $COOCH_3$ | " | " | $C_2H_4CN$ | 4 | 4 |
| 3 | " | CN | " | $C_2H_4OCOCH_3$ | $C_2H_4OCOCH_3$ | 3 | 3 |
| 4 | " | " | " | $C_2H_4COOCH_3$ | $C_2H_4COOCH_3$ | 4–5 | 4–5 |
| 5 | $CF_3$ | " | " | $C_2H_5$ | $C_2H_4COOCH_3$ | 3 | 3 |
| 6 | Cl | " | " | $C_2H_4OCOCH_3$ | $C_2H_4OCOCH_3$ | 3 | 3 |
| 7 | H | CN | $NHCOCH_3$ | $C_2H_5$ | $C_2H_5$ | 2–3 | 2–3 |
| 8 | " | " | $NHSO_2CH_3$ | $C_2H_4OCH_3$ | $C_2H_4OCH_3$ | 2–3 | 2–3 |

REFERENCE EXAMPLE 2

The dyestuffs of the present invention and the known dyestuffs (dyestuffs described in Japanese Patent Application (OPI) No. 41734/76) were examined in order to measure temperature dependence. The temperature dependence was measured by the following method.

Dyeing was carried out under dyeing conditions of 130° C.×60 minutes and 120° C.×60 minutes according to the process described in Example 1. The dyeing densities of each dyeing fabric were measured by eyes, and the temperature dependence was determined according to the following formula:

$$\text{Temperature dependence} = \frac{\text{Dyeing density in } 120° C. \times 60 \text{ minutes}}{\text{Dyeing density in } 130° C. \times 60 \text{ minutes}} \times 100$$

(The temperature for dyeing is generally 130° C., and the dyeing density reduces with falling of the temperature. The excellent dyestuff is that which causes less reduction of the dyeing density, and the most excellent dyestuff is that wherein the value of temperature dependence determined by the above-described formula is 100.)

REFERENCE EXAMPLE 2-1

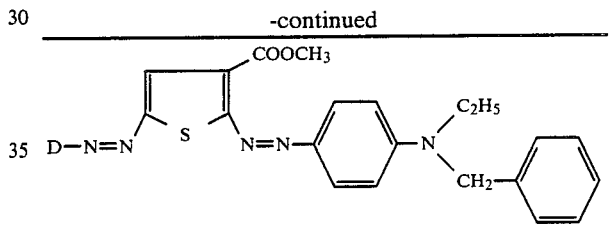

REFERENCE EXAMPLE 2-2

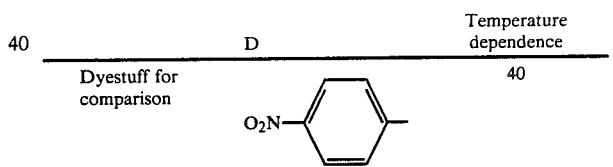

REFERENCE EXAMPLE 2-3

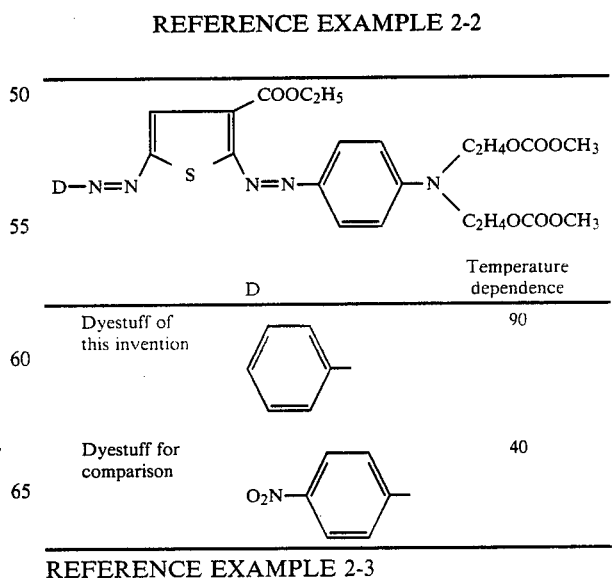

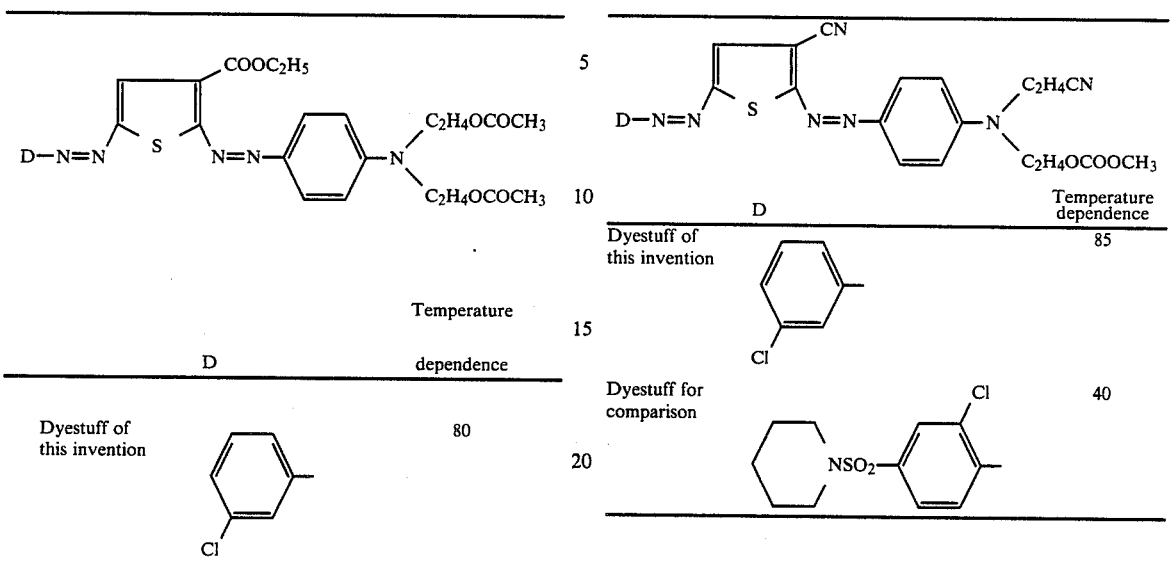

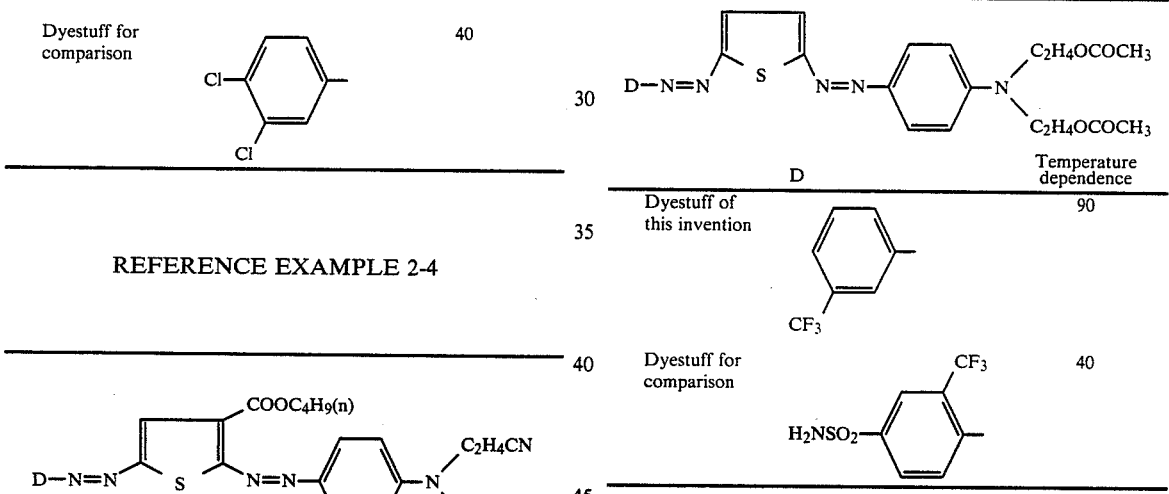

REFERENCE EXAMPLE 2-4

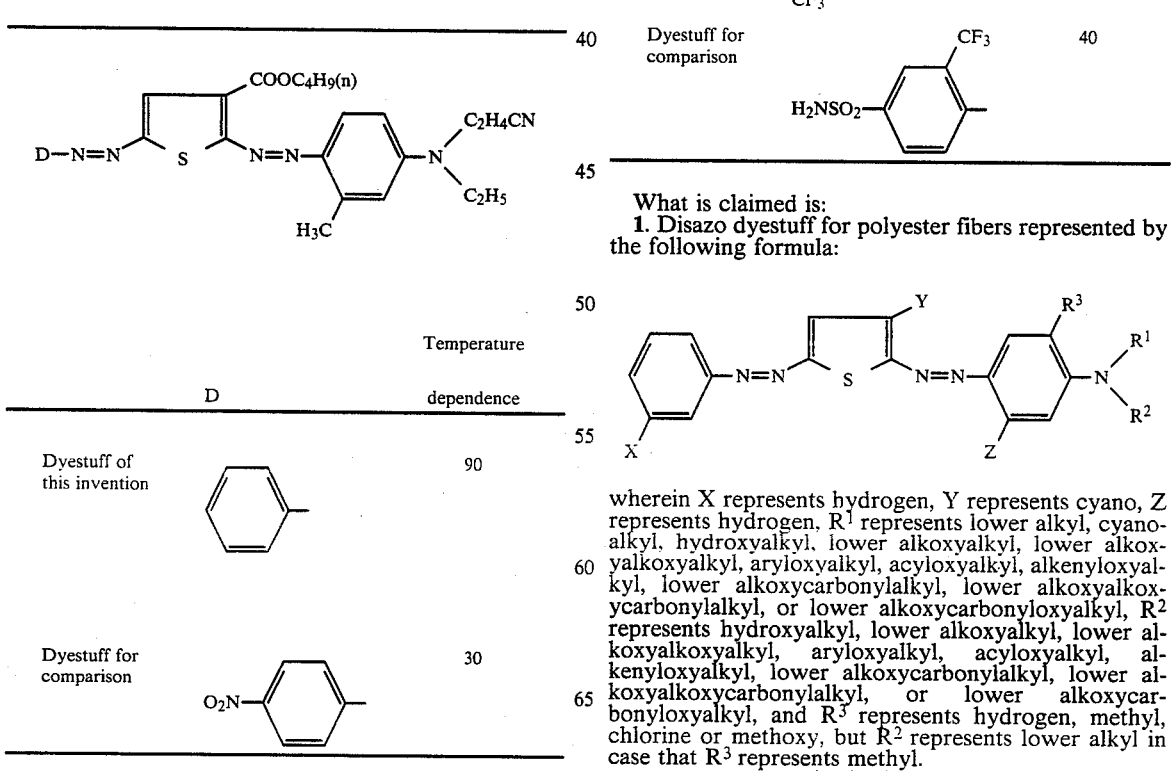

REFERENCE EXAMPLE 2-5

REFERENCE EXAMPLE 2-6

What is claimed is:

1. Disazo dyestuff for polyester fibers represented by the following formula:

wherein X represents hydrogen, Y represents cyano, Z represents hydrogen, $R^1$ represents lower alkyl, cyanoalkyl, hydroxyalkyl, lower alkoxyalkyl, lower alkoxyalkoxyalkyl, aryloxyalkyl, acyloxyalkyl, alkenyloxyalkyl, lower alkoxyalkoxycarbonylalkyl, lower alkoxyalkoxycarbonylalkyl, or lower alkoxycarbonyloxyalkyl, $R^2$ represents hydroxyalkyl, lower alkoxyalkyl, lower alkoxyalkoxyalkyl, aryloxyalkyl, acyloxyalkyl, alkenyloxyalkyl, lower alkoxycarbonylalkyl, lower alkoxyalkoxycarbonylalkyl, or lower alkoxycarbonyloxyalkyl, and $R^3$ represents hydrogen, methyl, chlorine or methoxy, but $R^2$ represents lower alkyl in case that $R^3$ represents methyl.

* * * * *